Patented Nov. 15, 1927.

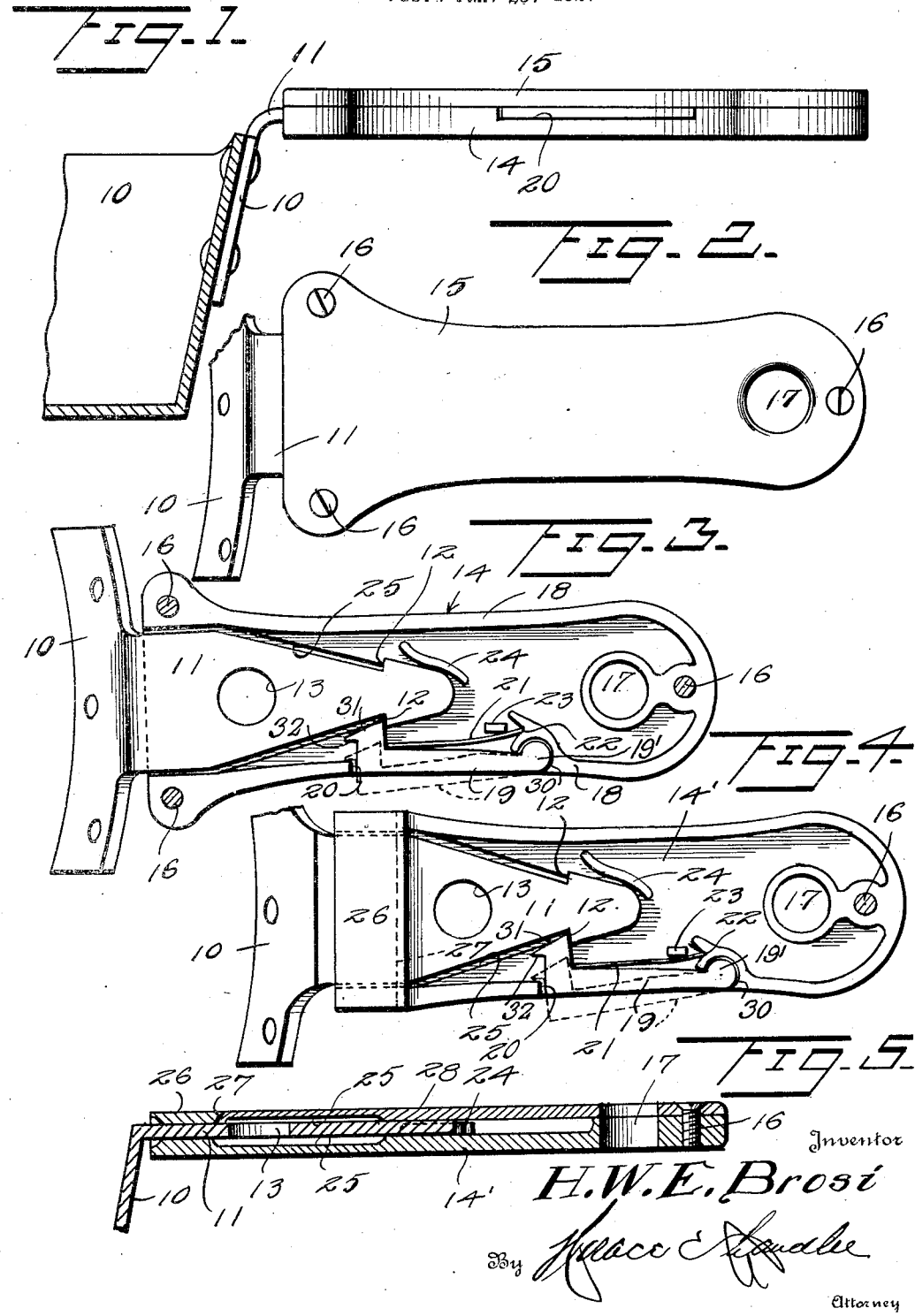

1,649,387

UNITED STATES PATENT OFFICE.

HENRY W. E. BROSI, OF OAKLAND, CALIFORNIA.

UTENSIL HANDLE.

Application filed January 29, 1927. Serial No. 164,615.

This invention relates to new and useful improvements in cooking utensils, and particularly to detachable handles therefor.

One object of the invention is to provide a handle which may be easily and quickly slipped onto the attached handle stub of a cooking utensil, and be releasably held in such position, while the person is lifting or carrying the utensil.

Another object is to provide a detachable handle which includes means operable by the thumb or finger, of the operator, for holding the handle engaged with the stub of the utensil, and which automatically releases itself from such stub, when the operator's thumb or finger is removed.

Other objects and advantages will be apparent from the following description when taken in connection with the accompanying drawing.

In the drawing:

Figure 1 is a side elevation of the handle in operative position, a fragment of a cooking utensil being shown in section.

Figure 2 is a top plan view of the same.

Figure 3 is a top plan view of the device, with the top plate removed to expose the inner mechanism.

Figure 4 is a view similar to that of Figure 3, showing a slightly modified form of the device.

Figure 5 is a vertical longitudinal central sectional view through the complete device of the modification of Figure 4.

Referring to the accompanying drawing, and particularly to Figures 1, 2, and 3, 10 represents a portion of a cooking utensil, of the stewing-pan type, which has riveted thereto the handle stub 11. This stub is preferably flat, and is formed with an outward taper, said tapered portion having the shoulders 12 on the opposite sides thereof. In the inner portion of the stub there is formed an opening 13, which permits suspending the pan on a nail.

The removable handle consists of a flat casing 14, the upper portion of which is removable, and indicated by the numeral 15, said upper portion being attached to the lower or body portion of the casing by means of screws 16. Formed vertically through the outer, or closed end of the casing 14, is an opening 17, for suspending the handle on a nail or hook. The lower or body portion of the casing is formed with a peripheral angularly extending flange 18, on which the top plate 15 rests, whereby to enclose a cavity, within the casing, for the reception of the stub handle 11, and the latch 19. A slot 20 is formed in one side of the casing, through which the latch 19 normally projects, said latch being urged outwardly by a leaf spring 21, bearing against the latch, and being engaged, at its inner end, within a notch or recess 22, in the casing, and a fixed lug, adjacent the recess, as shown at 23. Extending from the floor of the body of the casing, opposite the free end of the latch 19, is a curved lug 24, against which the end of the stub 11 is adapted to engage when inserted into the open end of the casing 14. The cover plate 15, and the floor of the body of the casing 14, are formed with the recesses or cavities 25, whereby to permit circulation of air, to prevent heating of the handle, from the stub 11.

Normally the latch 19 is projected outwardly through the slot 20, of the casing, by the leaf spring 21, and when the operator grasps the casing 14, he presses the latch inwardly, with his thumb, and then applies the handle to the stub 11, of the pan. As the stub passes into the casing the shoulder of the stub will be engaged by the latch, and as the operator retains the pressure on the latch, the casing 14 will be held in locked relation to the stub, thus permitting the pan to be lifted and carried. When the operator releases his thumb from the latch, the leaf spring forces the latch outwardly, out of engagement with the shoulder of the stub 11, thus permitting quick and easy withdrawal of the casing from the stub.

It will be noted that the stub 11 is formed with two shoulders 12, which provides for the proper engagement of the latch, with said stub, whether the removable handle casing 14 is applied with the cover plate uppermost, or the casing uppermost.

In Figures 4 and 5 there is shown a slight modification of the removable handle, wherein the stub engaging end of the casing 14' is provided with a transverse bridging member 26, which cooperates with the remainder of this end of the casing to form an opening for receiving the stub of the pan. The said member 26 is formed with an underbeveled inner edge 27, with which cooperates the beveled end of the cover plate 28, the other end of said plate being secured to the casing by the screw 16.

The inner end of the latch is formed with a circular portion 19', which is retained within an open-sided recess 30, formed in the casing, at one end of the slot 20. The free end of the latch has a bevel face 31, which permits the stub 11 to readily pass the same when entering the casing, and extending from the beveled end of the latch, outwardly through the slot 20, is a shoulder 32, which bears against the adjacent end wall of the slot to prevent the latch from moving beyond the side of the casing, under the influence of the leaf spring.

What is claimed is:

The combination with the stub handle of a vessel, said handle having a tapered portion and a lateral shoulder, of a removable handle comprising a casing having an open end receiving the stub therethrough and an opening in one side, and a latch in the casing normally urged out of the path of the stub and outwardly through said side opening, said latch being manually operable into engagement with the shoulder of the stub, upon grasping said removable handle.

In testimony whereof, I affix my signature.

HENRY W. E. BROSI.